United States Patent
Wyatt et al.

(10) Patent No.: US 7,484,503 B2
(45) Date of Patent: Feb. 3, 2009

(54) SYSTEM AND METHOD FOR DIESEL PARTICULATE FILTER REGENERATION

(75) Inventors: Sean C. Wyatt, Chicago, IL (US); Paul L. Berke, Chicago, IL (US); Felicia V. Centeno, Chicago, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 11/767,732

(22) Filed: Jun. 25, 2007

(65) Prior Publication Data

US 2008/0314371 A1 Dec. 25, 2008

(51) Int. Cl.
*F02B 47/08* (2006.01)
*F02M 25/07* (2006.01)
(52) U.S. Cl. .............. 123/568.16; 60/295; 60/274
(58) Field of Classification Search ............ 123/568.16, 123/568.11; 60/282, 286, 285, 295, 297, 60/303, 272, 273, 274
See application file for complete search history.

(56) References Cited

U.S. PATENT DOCUMENTS

| 7,104,051 | B2* | 9/2006 | Shimasaki et al. | ............ 60/297 |
|---|---|---|---|---|
| 7,334,400 | B2* | 2/2008 | Yan et al. | ............ 60/286 |
| 2003/0200746 | A1* | 10/2003 | Saito et al. | ............ 60/295 |
| 2004/0000139 | A1* | 1/2004 | Kawashima et al. | ............ 60/295 |
| 2004/0128985 | A1* | 7/2004 | Shimasaki et al. | ............ 60/286 |
| 2008/0010971 | A1* | 1/2008 | Gioannini et al. | ............ 60/274 |

* cited by examiner

*Primary Examiner*—Mahmoud Gimie
(74) *Attorney, Agent, or Firm*—Jack D. Nimz; Jeffrey P. Calfa

(57) ABSTRACT

A method for regenerating a diesel particulate filter (20) in the exhaust system (16) of an engine (12). When a request to regenerate the device is issued, a control system (14) operates the engine to begin conditioning exhaust. The conditioning process comprises a warming phase that occurs prior to initiation of regeneration and a heating phase during which regeneration can occur. During the process, data related to the warming phase and the heating phase is evaluated. The engine is operated to terminate the process prior to having reduced the amount of trapped particulate matter to a target amount when evaluation of the data discloses that the process should be terminated.

8 Claims, 2 Drawing Sheets

SYSTEM AND METHOD FOR DIESEL PARTICULATE FILTER REGENERATION

FIELD OF THE INVENTION

This invention relates generally to emission control systems in motor vehicles, such as trucks, that are powered by internal combustion engines, especially diesel engines that have after-treatment devices for treating exhaust gases passing through their exhaust systems.

BACKGROUND OF THE INVENTION

A known system for treating exhaust gas passing through an exhaust system of a diesel engine comprises a diesel oxidation catalyst (DOC) associated with a diesel particulate filter (DPF). The combination of these two exhaust gas treatment devices promotes chemical reactions in exhaust gas and traps diesel particulate matter (DPM) as exhaust flows through the exhaust system from the engine, thereby preventing significant amounts of pollutants such as hydrocarbons, carbon monoxide, soot, SOF, and ash, from entering the atmosphere.

A DPF requires regeneration from time to time in order to maintain engine performance. An engine control system typically estimates or infers particulate loading to determine if regeneration needs to be forced when the particulate loading reaches a level that is deemed excessive. However, regeneration can occur passively when conditions are favorable.

Regeneration is forced by creating conditions that will burn off trapped particulates. The creation of conditions for initiating and continuing regeneration typically involves elevating the temperature of exhaust gas entering the DPF to a suitably high temperature. Because a diesel engine typically runs relatively cool and lean, the post-injection of diesel fuel can be used as part of the strategy to elevate exhaust gas temperatures entering the DPF while still leaving excess oxygen for burning the trapped particulate matter.

Elevating exhaust temperature in that way for the purpose of regenerating a DPF decreases motor vehicle fuel efficiency. Furthermore, the manner in which a motor vehicle engine is being operated influences the regeneration process from the standpoints of both quality of regeneration and duration of regeneration. For example, a requested regeneration that seeks to reduce the amount of trapped matter to a target level may be terminated before the target is achieved (incomplete regeneration), or at an extreme the regeneration may fail entirely due to failure to achieve suitable exhaust conditions.

For evaluating a regeneration, a known strategy in effect calculates a rate at which trapped matter is being turned off by measuring, or estimating, the amount of matter burned off during a specified time interval. If the rate is sufficiently high, it is assumed that a satisfactory regeneration is occurring, and the regeneration is allowed to continue instead of being aborted. If the rate is not sufficiently high, it is assumed the regeneration should be aborted.

The inventors believe that a more robust strategy would be beneficial.

SUMMARY OF THE INVENTION

The present invention relates to a system and method for improving the quality of regeneration of an after-treatment device in an exhaust system of an engine and for terminating a regeneration when less than desired quality of regeneration is indicated.

When a regeneration request initiates a regeneration, engine operation is controlled in a manner that creates exhaust conditions suitable for performing regeneration, post-injection of fuel being one method for creating suitable exhaust conditions. In accordance with principles of the invention, the regeneration process is monitored both during a warming phase that precedes the actual onset of regeneration and during a heating phase when the temperature of exhaust passing through the device has become sufficiently high to cause regeneration.

The inventive system and method provide a software solution for analyzing the quality of regeneration by monitoring the warming phase, the heating phase, and any cycling between the two phases. By employing this more specific focus on the progress of exhaust temperature change, it is believed that a decision to either terminate an on-going process or allow it to continue can be more reliably made than by relying solely on the know method that evaluates the rate at which trapped matter is being purged from the after-treatment device.

The manner in which a motor vehicle engine is being operated has an influence of quality of regeneration. Some changes in operation can be beneficial to regeneration while others can be detrimental.

For example, some changes in vehicle operation may prolong the warming phase and/or reduce the probability that the heating phase can be achieved. In that situation, it may be deemed preferable to terminate the process in order to save fuel and wait until a later time to re-initiate the process when conditions may be more favorable.

Another indicator of quality of a regeneration process is the amount of cycling between the warming phase and the heating phase. An excessive amount of cycling can indicate a less than desired quality of regeneration that also makes it preferable to terminate the process in order to save fuel and wait until a later time to re-initiate the process when conditions may be more favorable.

Still another indicator of quality of a regeneration process is the amount of time spent in the heating phase. An excessive amount of time that doesn't reduce the trapped matter to the target is indicative a less than desired quality of regeneration that also makes it preferable to terminate the process in order to save fuel and wait until a later time to re-initiate the process when conditions may be more favorable.

One generic aspect of the invention relates to method for regenerating a DPF in the exhaust system of an engine.

The method comprises issuing a request to regenerate the device to reduce the amount of trapped matter in the device to a target amount and in response to the request, operating the engine to begin a process of conditioning exhaust for regenerating the device.

The conditioning process comprises a warming phase that occurs prior to initiation of regeneration and a heating phase during which regeneration can occur. During the process, data related to the warming phase and the heating phase is evaluated. The engine is operated to terminate the process prior to having reduced the amount of trapped matter to the target amount when evaluation of the data discloses that the process should be terminated.

Another generic aspect relates to an internal combustion engine comprising an exhaust system having a DPF that traps particulate matter in engine exhaust and at times requires regeneration to remove trapped particulate matter and a control system.

When regeneration has been requested, the control system 1) is effective to begin a process of conditioning exhaust for regenerating the DPF, the process comprising a warming phase that occurs prior to initiation of regeneration and a heating phase during which regeneration is occurring, 2) evaluates data related to the warming phase and the heating phase, and 3) operates the engine to terminate the process prior to having reduced the amount of trapped particulate matter to a target amount when evaluation of the data discloses that the process should be terminated.

The foregoing, along with further features and advantages of the invention, will be seen in the following disclosure of a presently preferred embodiment of the invention depicting the best mode contemplated at this time for carrying out the invention. This specification includes drawings, now briefly described as follows.

DESCRIPTION OF THE PREFERRED EMBODIMENT

Figure 1:
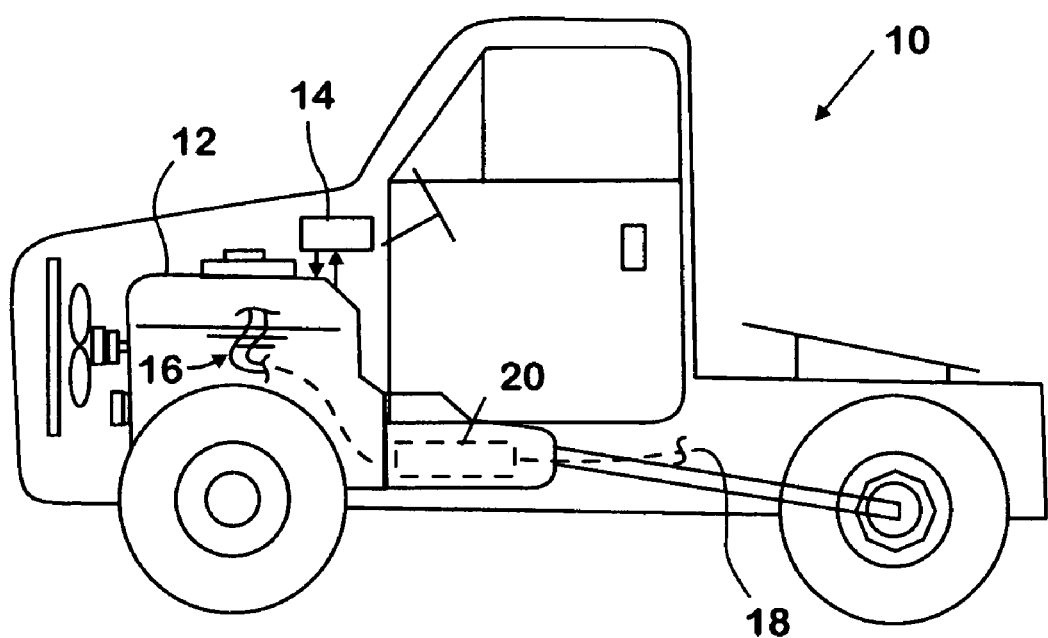
FIG. 1 shows portions of an engine in a motor vehicle relevant to the present invention.

FIG. 1 shows a truck 10 comprising a diesel engine 12 as the powerplant of the truck. Engine 12 has a processor-based engine control system 14 that processes data from various sources to develop various control data for controlling various aspects of engine operation. The data processed by control system 14 may originate at external sources, such as sensors, and/or be generated internally.

Engine 12 also has an exhaust system 16 through which exhaust created by combustion of a combustible mixture in combustion chambers of the engine is conveyed to a tail pipe 18 that opens to the surrounding atmosphere. Exhaust system 16 comprises one or more after-treatment devices, one of which is a diesel particulate filter (DPF) 20 that traps exhaust particulates so that they do not pass through to tail pipe 18.

As explained earlier, DPF 20 must be regenerated from time to time in order to remove trapped particulates. A need for regeneration is determined by control system 14 when an algorithm that is frequently executed discloses that the particulate load in DPF 20 has reached a point where regeneration should be forced. A regeneration request is then issued to start the regeneration process.

In response to the request, the engine operates to begin conditioning exhaust for regenerating DPF 20. The initial phase of the process comprises a warming phase that begins to heat exhaust passing through DPF 20. When the temperature becomes sufficiently high, the process enters the heating phase where regeneration occurs.

Figure 2:
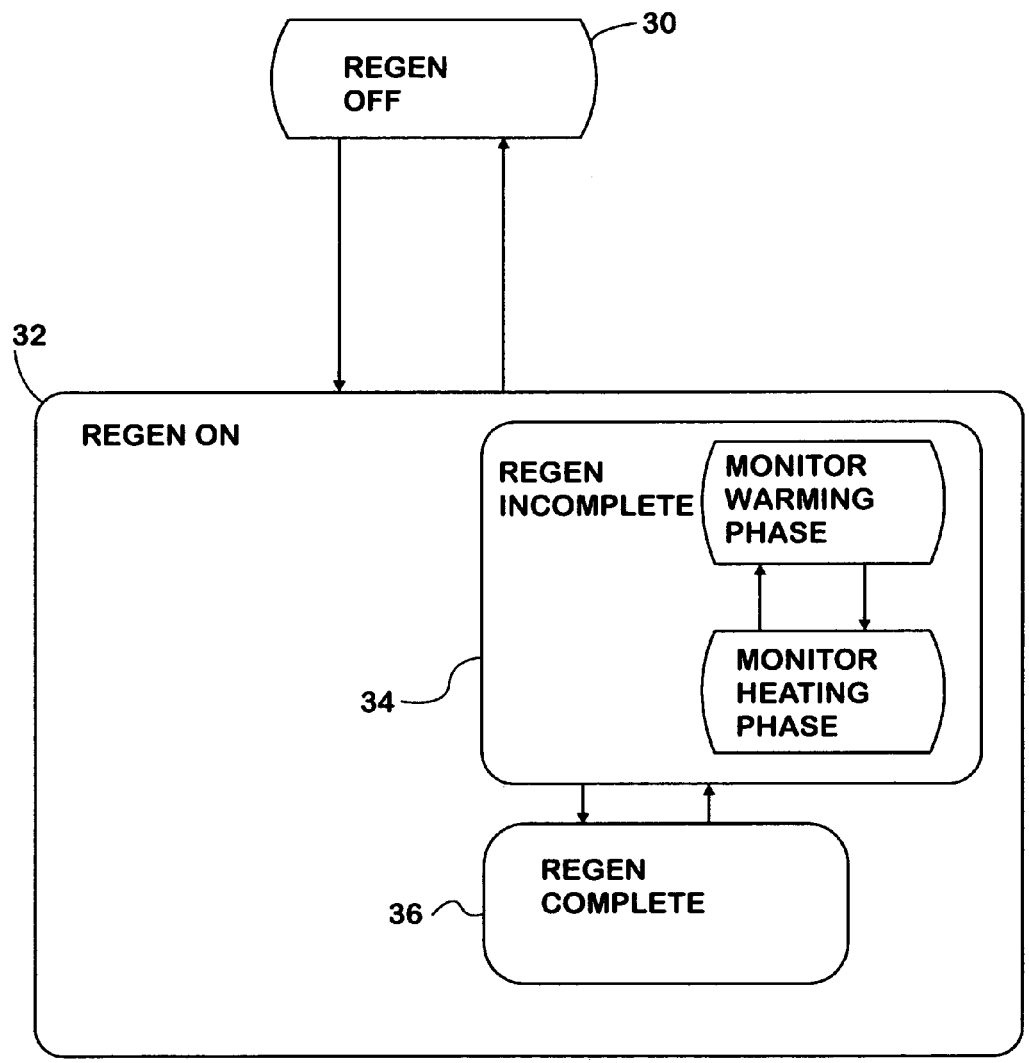
FIG. 2 is a general state diagram showing principles of the present invention.

In accordance with principles of the invention, control system 14 controls regeneration while also evaluating data related to the warming phase and the heating phase. The process is exemplified by the state diagram shown in FIG. 2.

The two principal states are a REGEN OFF state 30 and a REGEN ON state 32. State 32 is entered from state 30 by a regeneration request that may be issued by a measurement or estimate of trapped particulates in DPF 20 disclosing a need to regenerate the DPF or by a driver-actuated switch. When state 32 is entered, control system 14 controls engine operation to begin the process of conditioning the exhaust for achieving regeneration. At this state, regeneration is incomplete, as shown by a sub-state REGEN INCOMPLETE 34 of state 32.

The inventive strategy monitors the warming phase. If the warming phase remains in effect for more than a length of warming time suggesting that warming is taking too long, state 32 is exited and state 30 is entered.

If the warming phase remains in effect for less than that length of time, then the strategy monitors the heating phase. If the heating phase remains in effect for more than a length of heating time suggesting that it is taking too long, state 32 is exited and state 30 is entered. A return from state 32 to state 30 indicates that the terminated regeneration was not of a desired quality.

It is only when the heating phase has remained in effect for less than the allowable length of heating time and the amount of trapped particulates has been reduced to the target level that a REGEN COMPLETE state 36 is entered. It is assumed that attainment of state 36 represents completion of a regeneration of desired quality.

The strategy also monitors for excessive cycling between states 34 and 36 and terminates an on-going regeneration when the cycling is excessive.

While a presently preferred embodiment of the invention has been illustrated and described, it should be appreciated that principles of the invention apply to all embodiments falling within the scope of the invention that is generally described as follows.

What is claimed is:

1. A method for regenerating a diesel particulate filter in the exhaust system of an engine, the method comprising:
   issuing a request to regenerate the filter to reduce the amount of trapped particulate matter in the device to a target amount;
   in response to the request, operating the engine to begin a process of conditioning exhaust for regenerating the filter, the process comprising a warming phase that occurs prior to initiation of regeneration and a heating phase during which regeneration can occur;
   during the process, evaluating data related to the warming phase and the heating phase; and
   operating the engine to terminate the process prior to having reduced the amount of trapped particulate matter to the target amount when evaluation of the data discloses that the process should be terminated;
   wherein the step of evaluating data related to the warming phase and to the heating phase comprises counting cycling between the two phases, and the method comprises performing the step of operating the engine to terminate the process prior to having reduced the amount of trapped particulate matter to the target amount when the number of cycles counted equals a defined number.

2. A method for regenerating a diesel particulate filter in the exhaust system of an engine, the method comprising:
   issuing a request to regenerate the filter to reduce the amount of trapped particulate matter in the device to a target amount;
   in response to the request, operating the engine to begin a process of conditioning exhaust for regenerating the filter, the process comprising a warming phase that occurs prior to initiation of regeneration and a heating phase during which regeneration can occur;
   during the process, evaluating data related to the warming phase and the heating phase; and
   operating the engine to terminate the process prior to having reduced the amount of trapped particulate matter to the target amount when evaluation of the data discloses that the process should be terminated;
   wherein the step of evaluating data related to the warming phase and to the heating phase comprises measuring the time during which the process is in one of the phases, and the method comprises performing the step of operating the engine to terminate the process prior to having reduced the amount of trapped particulate matter to the target amount when the measured time attains a defined relationship to a reference time.

3. A method as set forth in claim 2 wherein the step of evaluating data related to the warming phase and to the heating phase comprises measuring the time during which the process is in the warming phase, and the method comprises performing the step of operating the engine to terminate the process prior to having reduced the amount of trapped particulate matter to the target amount when the measured time equals the reference time.

4. A method as set forth in claim 2 wherein the step of evaluating data related to the warming phase and to the heating phase comprises measuring the time during which the process is in the heating phase, and the method comprises performing the step of operating the engine to terminate the process prior to having reduced the amount of trapped particulate matter to the target amount when the measured time equals the reference time.

5. An internal combustion engine comprising:
   an exhaust system having a diesel particulate filter that traps particulate matter in engine exhaust and at time requires regeneration to remove trapped matter;
   a control system that 1) when regeneration has been requested, is effective to begin a process of conditioning exhaust for regenerating the device, the process comprising a warming phase that occurs prior to initiation of regeneration and a heating phase during which regeneration is occurring, 2) that evaluates data related to the warming phase and the heating phase; and 3) that operates the engine to terminate the process prior to having reduced the amount of trapped particulate matter to a target amount when evaluation of the data discloses that the process should be terminated;
   wherein the control system counts cycling between the two phases and is effective to terminate the process prior to having reduced the amount of trapped particulate matter to the target amount when the number of cycles counted equals a defined number.

6. An internal combustion engine comprising:
   an exhaust system having a diesel particulate filter that traps particulate matter in engine exhaust and at times requires regeneration to remove trapped matter;
   a control system that 1) when regeneration has been requested, is effective to begin a process of conditioning exhaust for regenerating the device, the process comprising a warming phase that occurs prior to initiation of regeneration and a heating phase during which regeneration is occurring, 2) that evaluates data related to the warming phase and the heating phase; and 3) that operates the engine to terminate the process prior to having reduced the amount of trapped particulate matter to a target amount when evaluation of the data discloses that the process should be terminated;
   wherein the control system measures the time during which the process is in one of the phases and is effective to terminate the process prior to having reduced the amount of trapped particulate matter to the target amount when the measured time attains a defined relationship to a reference time.

7. An engine as set forth in claim 6 wherein the control system measures the time during which the process is in the warming phase and is effective to terminate the process prior to having reduced the amount of trapped particulate matter to the target amount when the measured time equals the reference time.

8. An engine as set forth in claim 6 wherein the control system measures the time during which the process is in the heating phase and is effective to terminate the process prior to having reduced the amount of trapped particulate matter to the target amount when the measured time equals the reference time.

* * * * *